March 10, 1936.　　　　　O. NEISS　　　　　2,033,732
PROCESS FOR THE WORKING UP OF SOAPS
Filed Sept. 20, 1934
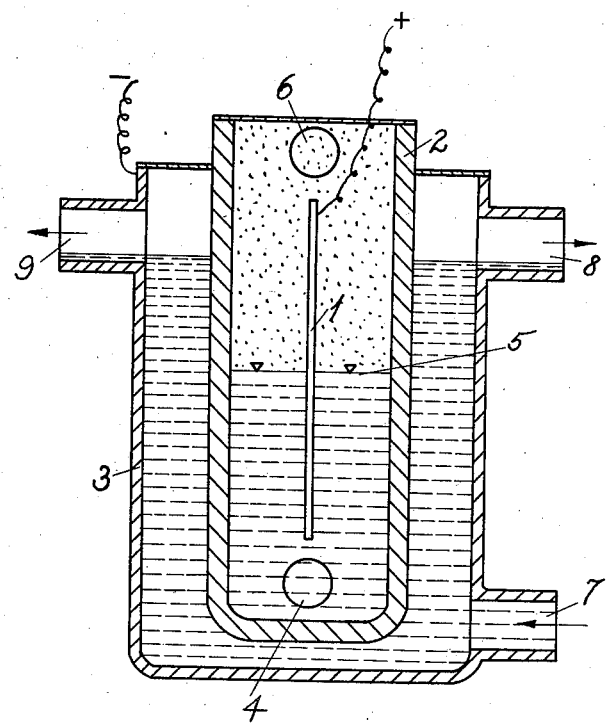
INVENTOR
Oskar Neiss
BY
*Bailey and Larson*
ATTORNEYS Patented Mar. 10, 1936

2,033,732

UNITED STATES PATENT OFFICE 2,033,732

PROCESS FOR THE WORKING UP OF SOAPS

Oskar Neiss, Hamburg, Germany, assignor to firm Hanseatische Mühlenwerke Aktiengesellschaft, Hamburg, Germany Application September 20, 1934, Serial No. 744,836
In Germany August 27, 1934

5 Claims.  (Cl. 204—9)

The invention concerns a process for the working up of soaps in particular of soap solutions such as those resulting as soap stock in the deacidification of oils and fats for example with soda lye or soda solution.

Hitherto the soap stock which practically for example has the following composition:

|                              | Per cent |
|------------------------------|----------|
| Water                        | 68.5     |
| Neutral oil                  | 11.4     |
| Fatty acid in the form of soap | 18.61  | has usually been worked up in such manner that the soap is split for example with sulphuric acid so that a decomposition into free fatty acid and sodium sulphate and bisulphate results when sodium hydroxide is employed. This process is subject to the following disadvantages: The regeneration of free caustic soda (NaOH) from the soap was hitherto, from economic considerations, not possible. The decomposition of the soap solution with sulphuric acid into free fatty acid and sulphate was carried out in stages in decomposition vessels which with the usually resulting large quantities of soap stock require a considerable space, since the fatty acid after the splitting must be freed from sodium sulphate by washing. When finally the mixture of raw fatty acid and neutral oil has to be converted in autoclaves with the aid of steam and hydrogen under pressure practically into hardened fatty acids, then a hydrogen generating apparatus is necessary which operates according to a purely chemical or electro-chemical process.

Such disadvantages are avoided according to the present invention in that the soap solution is split up in an electrolytic manner. The electrolysis of the soap solution is carried out according to the invention with separation of the anode and cathode spaces by a diaphragm. According to a particular embodiment of the invention the anode space is only partly filled with the soap solution and the resulting foamy mixture of fatty acid and gas which still contains a residue of soap solution is further subjected to electrolysis.

Preferably the process is conducted continuously in that the soap solution is constantly led into the anode space in the quantity determined by the decomposition. According to a particular embodiment of the invention the soda lye separating in the cathode space is again fed back into the operation cyclically. The resulting hydrogen can be employed for hydrogenation or for example for the reduction of the fatty acids to aliphatic alcohols.

In the drawing an embodiment of the invention is shown schematically. The splitting up of the soap solution is conducted in an electrolytic cell which is provided with an anode 1 which is separated by a diaphragm 2 from the cathode 3 constructed as electrolyte container; the cathode 3 consists preferably of a metallic container. The anode space which is formed by the diaphragm 2 and contains the anode 1 which is connected to the positive pole of a direct current supply, serves for the reception of the soap solution which is introduced by an inlet or conduit 4. The cathode space which is formed by the metallic container 3 and is inwardly limited by the diaphragm 2 is filled with an electrically conducting liquid such as a 5% soda lye. The distance between the electrodes amounts as in normal water electrolysis to a few centimetres and is proportioned in general according to the conditions obtaining. The current has preferably a strength of about 5 amperes per square decimetre (0.32 ampere per square inch) with a voltage difference of about 10 volts. The voltage difference is influenced by the character of the diaphragm which may consist of ceramic material, asbestos or the like.

If the anode space is filled to the liquid levels indicated by 5 with a soap solution of the composition

|                              | Per cent |
|------------------------------|----------|
| Water                        | 68.5     |
| Neutral oil                  | 11.4     |
| Fatty acid in the form of soap | 18.6   | and if a direct current is passed through the cell from the anode 1 to the cathode 3, then an electrolytic decomposition of the dissolved soap is brought about in the anode space in which the metallic ion wanders through the diaphragm 2 to the cathode 3 and is there discharged, while the fatty acid radical is discharged at the anode. The soap solution in the anode space is thus deprived of soda lye which enriches the cathode liquid in the cathode space. In the anode space after complete electrolysis there remains practically alkali-free fatty acid besides neutral oil.

Such a result can only be obtained when the following assumptions are made in conjunction with the invention. The enrichment of the soda lye in the cathode space if the process is to be operated economically, must be increased to a concentration of 10 to 15%. On the other hand, a prerequisite of the process is that the diaphragm 2 has a porosity which per se does not permit a mechanical separation of the soda lye of so high a concentration from the fatty acid in the anode space. For the wandering of the metallic ion through the diaphragm 2 to the cathode 3 a porosity of not too great a density is required. Obviously on this basis an electrolytic decomposition of soap solutions into soda lye and fatty acids was not possible.

In the splitting up of the soap solution in the anode space as above described the fatty acid deposits at the immersed anode surface. At the same time oxygen in the form of gas bubbles evolves at the anode. The gas endeavours to escape above from the anode space for example by the exit 6. By suitable proportioning of the anode space, namely by relatively high shaft-like construction with small liquid cross section, or by the provision of baffle elements the gas attains a greater speed of flow. In this way the fatty acid particles are mechanically loosened from the anode surface by the rising gas bubbles and are removed from the soap solution to the liquid surface. Thus above the liquid surface 5 in the anode space there forms a foamy mixture of fatty acid and neutral oil which on its way up to the exit 6 is further subjected to electrolysis and so practically completely freed from its alkaline constituent.

Oxygen gas and free fatty acid are withdrawn by the exit 6.

This process can be continuously operated by constantly introducing through the inlet 4 so much soap solution as can be split up by the electrolytic process. The free soda lye collects in the cathode space and brings this in the course of operation to an increased concentration. In order to obtain a particular or a maximum concentration water or the like can be introduced through the inlet 7 into the cathode space.

The soda lye leaves the electrolytic container 3 continuously by the exits 8 and 9 to be fed back for further use cylically in the operation, for example for the deacidification of the raw oil. Simultaneously hydrogen is developed at the cathode and this, as required, is removed through the exits 8 and 9 and can be utilized for example for final hydrogenation.

Since, according to the present invention, operation may be continuous and the products of the splitting up result in proportion as fresh soap solution is obtained from the oil de-acidification and is supplied, an accumulation of unsplit soap stock in the process is avoided. The apparatus according to the invention is thus characterized by a small requirement as to space. It is of importance also that the soda lye is recovered not only pure but also in a suitable concentration such as is required further for the de-acidification of the oil.

The process according to the present invention as compared with the chemical separation process is not only simpler but also more economical.

I claim:—

1. Process for the working up of aqueous mixtures containing soluble soap, which includes the step of subjecting the solution to electrolysis, thereby decomposing the soluble soap, and isolating the free fatty acid derived from such decomposition at the anode.

2. Process for the treatment of aqueous liquids containing soluble soap, which includes treating the said liquids in an electrolytic cell, in which the anode is separated from the cathode by a porous diaphragm, thereby decomposing the soluble soap, and isolating the free fatty acid derived from such decomposition at the anode.

3. Process for the treatment of aqueous liquids containing soluble soap, which consists in adding said liquids to the anode compartment of an electrolytic cell in which the anode and cathode are separated by a porous diaphragm, placing a conductive solution in the cathode chamber, passing a current through the said cell, thereby decomposing the soluble soap, and isolating the free fatty acid derived from such decomposition at the anode.

4. Process for the treatment of aqueous liquids containing soluble soap, which consists in electrolyzing said liquids in an electrolytic cell, in which the anode is separated from the cathode by a porous diaphragm, and the anode space is large compared with the quantity of liquid therein, thereby decomposing the soluble soap, the oxygen disengaged at the anode being caused to disengage the free fatty acid deposited at the anode and derived from such decomposition to convey the free fatty acid so disengaged to the liquid surface and to form a foam at the liquid surface, removing the foam while continuing operation of the cell at a level considerably above the liquid level in the anode space, and subjecting the foam while in the anode space to further electrolysis.

5. Process for the treatment of aqueous liquids containing soap stock produced by the de-acidification of oils, which consists in electrolyzing said stock in an electrolytic cell, in which the anode is separated from the cathode by a porous diaphragm, thereby decomposing the soap stock, forming a foam on the surface of the anode liquid, said form consisting of oxygen disengaged at the anode, free fatty acid derived from such decomposition and natural oil, and further electrolyzing said foam until it is substantially free from metallic ion.

OSKAR NEISS.